Figure 1:
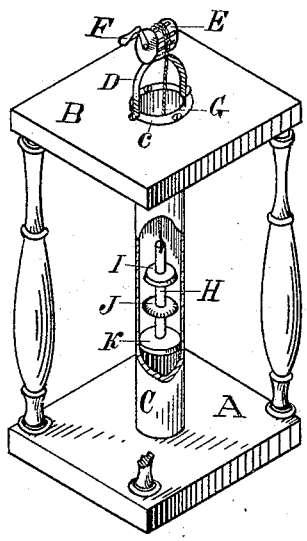

J. U. BRAMAN.
MACHINERY FOR LINING HYDRAULIC HOSE.

No. 170,153. Patented Nov. 23, 1875.

UNITED STATES PATENT OFFICE.

JOSEPH U. BRAMAN, OF BOSTON, MASSACHUSETTS.

IMPROVEMENT IN MACHINERY FOR LINING HYDRAULIC HOSE.

Specification forming part of Letters Patent No. 170,153, dated November 23, 1875; application filed August 26, 1875.

*To all whom it may concern:*

Be it known that I, JOSEPH U. BRAMAN, of Boston, in the county of Suffolk, State of Massachusetts, have invented a certain new and useful Improvement in Hose-Pipes, of which the following is a description sufficiently full, clear, and exact to enable any person skilled in the art or science to which my invention appertains to make and use the same, reference being had to the accompanying drawing forming a part of this specification, in which—

Figure 1 is a sectional isometrical perspective view.

My invention relates more especially to the mechanism for interiorly coating the pipe with rubber; and consists in a novel construction and arrangement of the parts, as hereinafter more fully set forth and claimed, by which a simpler, cheaper, and more effective device of this character is produced than is now in ordinary use.

In lining or coating linen hose-pipe with rubber by the ordinary method, a thin rubber tube is sometimes placed within the hose, and one end of the same securely closed. Steam is then let into the open end, expanding the rubber, and forcing it against the linen body or covering, the heat imparted by the steam causing the rubber to melt and adhere to the linen. This method is objectionable for obvious reasons, but principally on account of the difficulty of inserting the rubber tube and the injurious effects of the steam.

My invention is designed to obviate this difficulty and objection; and to that end I make use of means which will be readily understood by all conversant with such matters from the following description:

In the drawing, A B represent the frame, in which the hose C is suspended by the collet c, the lower end being secured to the bed-piece of the frame-work. A drum, E, provided with a crank-shaft, F, is journaled horizontally in the support D, disposed in the upper part of the frame-work immediately over the pipe C. Around the drum there is a cord, G, and attached to the free end of the same a rod, H. This rod carries three disks of unequal diameters, the disk K being largest, J slightly less, and I the least. The disk K does not quite fill the hose-pipe, the space between its periphery and the interior surface of the pipe being equal to the thickness of the rubber lining it is desired to apply.

In the use of my improvement, the spreader formed by the rod H and disks I J K is lowered to the bottom of the pipe. A proper solution of rubber is then poured into the upper end of the pipe upon the spreader, which is then elevated by means of the crank F. The disk I partially spreads the solution, the operation being assisted and nearly perfected by the larger disk J, and completed by the disk K, the disks acting in regular succession to perfect the work.

The rubber solution should be of such a consistency as to dry rapidly, and not to run after the passage of the spreader.

I am aware that cone-shaped tools have been drawn up through iron and other drain-pipes for the purpose of spreading cement therein; but from the nature of the article I propose treating, and the character of the rubber solution used, the conical tool which has heretofore been used would not be suited to accomplish the result.

The conical tool presents but one spreading-surface, to which the cement is presented in bulk on an incline.

With the rubber solution it is necessary to spread at intervals, and by a succession of spreaders, to gradually reduce the thickness of the solution, and at each reduction to again compress it, and force it into the meshes of the textile or woven fabric.

Each disk acts in succession to perfect the work.

Having thus explained my improvement, what I claim is—

The improved mechanism described, the same consisting of the frame A B, rod H, disks I J K, drum E, and cord G, arranged to operate, in coating the pipe C, substantially as and for the purpose set forth and specified.

JOSEPH U. BRAMAN.

Witnesses:
C. A. SHAW,
H. E. METCALF.